(12) United States Patent
Mandoux (10) Patent No.: US 11,953,393 B2
(45) Date of Patent: Apr. 9, 2024

(54) 6 PHASE MOTOR TORQUE MEASUREMENT AND CONTROL SYSTEM

(71) Applicant: BORGWARNER LUXEMBOURG AUTOMOTIVE SYSTEMS S.A., Bascharage (LU)

(72) Inventor: Felix Mandoux, Hettange-Grande (FR)

(73) Assignee: BorgWarner Luxembourg Automotive Systems SA, Bascharage (LU)

( * ) Notice: Subject to any disclaimer, the term of this patent is extended or adjusted under 35 U.S.C. 154(b) by 329 days.

(21) Appl. No.: 17/598,371

(22) PCT Filed: Mar. 16, 2020

(86) PCT No.: PCT/EP2020/057028
§ 371 (c)(1),
(2) Date: Sep. 27, 2021

(87) PCT Pub. No.: WO2020/193242
PCT Pub. Date: Oct. 1, 2020

(65) Prior Publication Data
US 2022/0187148 A1    Jun. 16, 2022

(30) Foreign Application Priority Data

Mar. 27, 2019   (GB) ..................... 1904248

(51) Int. Cl.
*G01L 3/10* (2006.01)
*H02P 25/22* (2006.01)

(52) U.S. Cl.
CPC ............... *G01L 3/10* (2013.01); *H02P 25/22* (2013.01)

(58) Field of Classification Search
None
See application file for complete search history.

(56) References Cited

U.S. PATENT DOCUMENTS

2009/0302792 A1   12/2009  Osada et al.
2016/0329850 A1*  11/2016  Mori ..................... B62D 5/046
(Continued)

FOREIGN PATENT DOCUMENTS

CN    107222146 A    9/2017
CN    108282126 A    7/2018
(Continued)

OTHER PUBLICATIONS

T. W. Stegink, C. De Persis and A. J. Der Schaft, An energy-based analysis of reduced-order models of (networked) synchronous machines, Mathematical and Computer Modelling of Dynamical Systems, Feb. 12, 2019, 1-39 pages, vol. 25, No. 1, https://doi.org/10.1080/13873954.2019.1566265.

*Primary Examiner* — Brandi N Hopkins
*Assistant Examiner* — Nigel H Plumb
(74) *Attorney, Agent, or Firm* — Joshua M. Haines; Bookoff McAndrews, PLLC (57) ABSTRACT

A method of measuring torque is provided in a six phase electrical motor which includes a motor-stator including two electrically independent stator winding arrangements which each have three combined windings such that the winding arrangements are symmetrical and offset by an angle to each other and such that each combined winding of the second stator arrangement has a corresponding combined winding in the first stator arrangement and offset thereto by an angle. The method includes a) determining the current in the three combined windings of the first stator arrangement and/or the current in the three combined windings of the second stator arrangement and b) determining the torque from the currents.

20 Claims, 3 Drawing Sheets

(56) References Cited

U.S. PATENT DOCUMENTS

2017/0373627 A1* 12/2017 Suzuki .................... H02P 21/20
2019/0089273 A1   3/2019 Kirby et al.

FOREIGN PATENT DOCUMENTS

| CN | 108574442 A | 9/2018 |
| DE | 102015220366 A1 | 4/2017 |
| DE | 102017210304 A1 | 12/2017 |

* cited by examiner

6 PHASE MOTOR TORQUE MEASUREMENT AND CONTROL SYSTEM

CROSS REFERENCE TO RELATED APPLICATIONS

This application is a national stage application under 35 USC 371 of PCT Application No. PCT/EP2020/057028 having an international filing date of Mar. 16, 2020, which is designated in the United States and which claimed the benefit of GB Patent Application No. 1904248.0 filed on Mar. 27, 2019, the entire disclosures of each are hereby incorporated by reference in their entirety.

TECHNICAL FIELD

This invention relates to electrical machines such as electrical motors and has particular application to six phase dual delta or dual star machines. It relates to a method and apparatus of measuring and controlling torque in such motors.

BACKGROUND OF THE INVENTION

Synchronous electrical machines are commonly used with a torque controller. The torque controller makes use of current measurements on the motor phases in order to get feedback on the actual delivered or absorbed mechanical torque. Based on this measurement, a control algorithm does adjust the machine output control parameters in order to achieve a torque demand according a given set point. Common control techniques like field oriented control, allow a very precise torque accuracy.

In the particular case of a six phase dual delta or dual star machine, the machine stator is built of two electrically independent stator windings. Usually the windings are symmetrical and shifted by an angle of 30°. Classical control schemes make use of all six phase currents measured either in the phase path or in the ground leg of the twelve leg inverter to calculate an actual torque equivalent current. The advantage of this system is the high machine dynamics capability, which although is not required in all systems (e.g. belt driven systems or high inertia systems). The drawback of this method is, that an additional measurement system is required to provide essential redundancy for functional safety requirements towards torque control. Partial independence may be achievable by means of software and diagnostics, but since the measurement hardware (shunts, amplifiers, filters, ADCs,) are shared, a lot of common mode failure cases may persist. An additional problem is that it requires measurement of current on all six lines.

SUMMARY OF THE INVENTION

In one aspect is provided a method of measuring torque in a six phase electrical motor, said motor including a motor stator including two electrically independent stator winding arrangements (U,V,W), (X,Y,Z) each comprising three combined windings; said winding arrangements being symmetrical and offset by an angle γ to each other, such that each combined winding of the second stator arrangement has a corresponding combined winding in the first stator arrangement and offset thereto by an angle γ, said method comprising:
a) determining the current (Iu, Iv, Iw) in the three combined windings (U,V,W) of the first stator arrangement and/or the current (Ix, Iy, Iz) in the three combined windings (X,Y,Z) of the second stator arrangement;
b) determining the torque the currents determined from a).

The Torque May be s Determined from Following Equation:

$$T \cong \frac{1}{\omega} \cdot \sqrt{6} \cdot (V_{d1} \cdot I_{d1} + V_{q1} \cdot I_{q1})$$

where ω=angular speed, and $$\begin{bmatrix} I_{d1} \\ I_{q1} \end{bmatrix} = \frac{2}{3} \cdot \begin{bmatrix} \cos\theta & \cos\left(\theta - \frac{2\pi}{3}\right) & \cos\left(\theta - \frac{4\pi}{3}\right) \\ -\sin\theta & -\sin\left(\theta - \frac{2\pi}{3}\right) & -\sin\left(\theta - \frac{4\pi}{3}\right) \end{bmatrix} \cdot \begin{bmatrix} I_U \\ I_V \\ I_W \end{bmatrix}$$

and where is θ is the angle of the rotor relative to the first stator; and where Vd1 is the direct voltage applied across the windings of the first stators arrangement and Vq1 is the quadrature voltages applied across the windings of the first stator arrangement.

The torque may be determined from following equation:

$$\frac{1}{\omega} \cdot \sqrt{6} \cdot (V_{d2} \cdot I_{d2} + V_{q2} \cdot I_{q2})$$

a where ω=angular speed, and $$\begin{bmatrix} I_{d2} \\ I_{q2} \end{bmatrix} = \frac{2}{3} \cdot \begin{bmatrix} \cos(\theta+\gamma) & \cos\left(\theta+\gamma - \frac{2\pi}{3}\right) & \cos\left(\theta+\gamma - \frac{4\pi}{3}\right) \\ -\sin(\theta+\gamma) & -\sin\left(\theta+\gamma - \frac{2\pi}{3}\right) & -\sin\left(\theta+\gamma - \frac{4\pi}{3}\right) \end{bmatrix} \cdot \begin{bmatrix} I_x \\ I_y \\ I_z \end{bmatrix}$$

where Vd2 is the direct voltage applied to the windings of the second stators arrangement and Vq2 is the quadrature voltage applied the windings of the second stator arrangement; and where is θ is the angle of the rotor of said motor relative to the first stator arrangement.

Step a) may be performed by measuring the current (Iu, Iv, Iw) in the three combined windings (U, V, W) of the first stator arrangement or measuring the current (Ix, Iy, Iz) in the three combined windings (X, Y, Z) of the second stator arrangement.

Step a) may comprise i) measuring the current in two of the three combined windings of the first or second stator arrangement, and ii) determining or inferring the current in the other of the three windings thereof from the results of step i)

The currents may be measured in the phase path.

The motor may include an inverter and the current may be measured in the ground leg of the inverter.

Said motor may be a six phase dual delta or dual star machine.

In a further aspect is provided a controller for a six phase electrical motor and controller therefor, said motor including a motor stator including two electrically independent stator winding arrangements (UVW,XYZ), each comprising three combined windings; said winding arrangements being symmetrical and offset by an angle γ to each other, such that each combined winding of the second stator arrangement has a corresponding combined winding in the first stator arrangement and offset there to by an angle γ, including a controller is adapted to determine the current in each of the three combined windings of the first stator arrangement and/or determine the current in each of the three combined windings of the second arrangement; the controller further adapted to determine the torque from said currents.

The controller may be further adapted to determine torque from following equation:

$$T \cong \frac{1}{\omega} \cdot \sqrt{6} \cdot (V_{d1} \cdot I_{d1} + V_{q1} \cdot I_{q1})$$

where ω=angular speed, and $$\begin{bmatrix} I_{d1} \\ I_{q1} \end{bmatrix} = \frac{2}{3} \cdot \begin{bmatrix} \cos\theta & \cos\left(\theta - \frac{2\pi}{3}\right) & \cos\left(\theta - \frac{4\pi}{3}\right) \\ -\sin\theta & -\sin\left(\theta - \frac{2\pi}{3}\right) & -\sin\left(\theta - \frac{4\pi}{3}\right) \end{bmatrix} \cdot \begin{bmatrix} I_U \\ I_V \\ I_W \end{bmatrix}$$

where Vd1 is the direct voltage applied across the windings of the first stators arrangement and Vq1 is the quadrature voltages applied across the windings of the first stators arrangement; and
where is θ is the angle of the rotor of said motor relative to the first stator arrangement.

The controller may be further adapted to determine torque from following equation:

$$\frac{1}{\omega} \cdot \sqrt{6} \cdot (V_{d2} \cdot I_{d2} + V_{q2} \cdot I_{q2})$$

where ω=angular speed, and $$\begin{bmatrix} I_{d2} \\ I_{q2} \end{bmatrix} = \frac{2}{3} \cdot \begin{bmatrix} \cos(\theta+\gamma) & \cos\left(\theta+\gamma - \frac{2\pi}{3}\right) & \cos\left(\theta+\gamma - \frac{4\pi}{3}\right) \\ -\sin(\theta+\gamma) & -\sin\left(\theta+\gamma - \frac{2\pi}{3}\right) & -\sin\left(\theta+\gamma - \frac{4\pi}{3}\right) \end{bmatrix} \cdot \begin{bmatrix} I_X \\ I_Y \\ I_Z \end{bmatrix}$$

where Vd2 is the direct voltage applied to the windings of the second stator arrangement and Vq2 is the quadrature voltage applied the windings of the second stator arrangement; and where is θ is the angle of the rotor of said motor relative to the first stator arrangement.

The controller may be further adapted to measure the currents in each of the three combined windings of the first stator arrangement and/or second stator arrangement.

A controller may be further adapted to measure the current in two of the three combined windings of the first or second stator arrangement, and determine or infer the current in the other of the three windings thereof.

The controller may be adapted to determine a first value of torque from the current determinations in respect of said first stator and to determine a second value of torque from the current determinations in respect of said second.

The controller may be adapted to control the operation on the basis of said first value of torque and adapted to use the second value of torque for safety or monitoring purposes.

In a further aspect is a system including a controller as claimed.

The controller in the system may be adapted to measure the currents in the phase path.

The system may include an inverter and the controller is adapted to measure the current in the ground leg of the inverter.

Said motor in the system may be six phase dual delta or dual star machine.

The term "combined winding" refers to the coils/windings in series between connection points.

BRIEF DESCRIPTION OF THE DRAWINGS

The present invention is now described by way of example with reference to the accompanying drawings in which:

FIGS. 2b and 2c shows a schematic view of each of the independent winding arrangements of a dual system corresponding to FIG. 2a;

FIGS. 3b and 3c shows the two winding arrangements of FIG. 3a;

DESCRIPTION OF THE PREFERRED EMBODIMENTS

Figure 1:
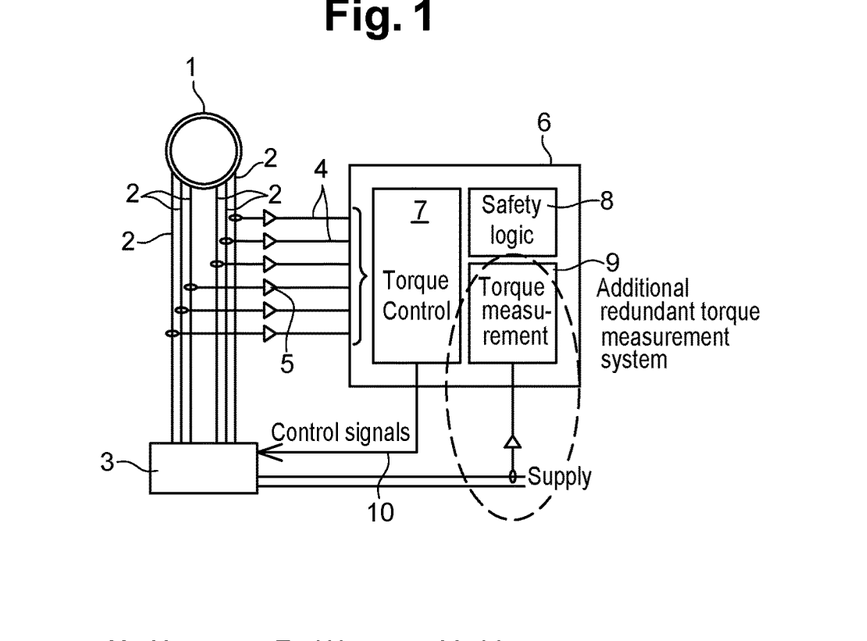
FIG. 1 shows a diagram of a prior art system comprising a six phase electrical motor.

FIG. 1 shows a diagram of a prior art system comprising a six phase electrical motor 1 which is where the stator windings are supplied with current through corresponding 6 lines 2 from a controller such as a microprocessor 6 which controls the current via a (power) device 3. The controller may alternatively be regarded as the microprocessor and device 3 together.

A current measurement system measures current passing though the stator windings via six current sensing lines 4 which may include amplifiers 5 for amplification; the amplified measured current is fed into the microprocessor. These are used in torque/measurement control functionality block 7 of the processor which outputs control signals along line 10 to device 3. In addition, there may be a (further) torque measurement system where a parameter relating to torque is fed from 3 to a torque measurement function 9 of the system. The torque control unit actually also measures torque from the six measurement lines and so the additional torque measurement system may be regarded as redundant.

As mentioned in order to get the required redundancy on the torque measurement some hardware redundancy is required. Six phase current measurement shunts are usually installed for control. Less cannot be used because the machine has to be well balanced in order to reduce current harmonics, particularly tricky to handle on six phase machines. In addition, a current measurement system for the total generated or consumed current is required. This one is used to calculate the torque from the electrical power.

The torque measured by the torque control unit 7 is determined from equation $$T_e = f(I_U, I_V, I_W, I_X, I_Y, I_Z) = K \cdot I_Q$$

The power measured by the torque measurement system 9 is determined from equation $$P_e = \omega \cdot T_e = V_{DC} \cdot I_{DC}$$

Or $$T_e = \frac{V_{DC} \cdot I_{DC}}{\omega}$$

Figure 2A:
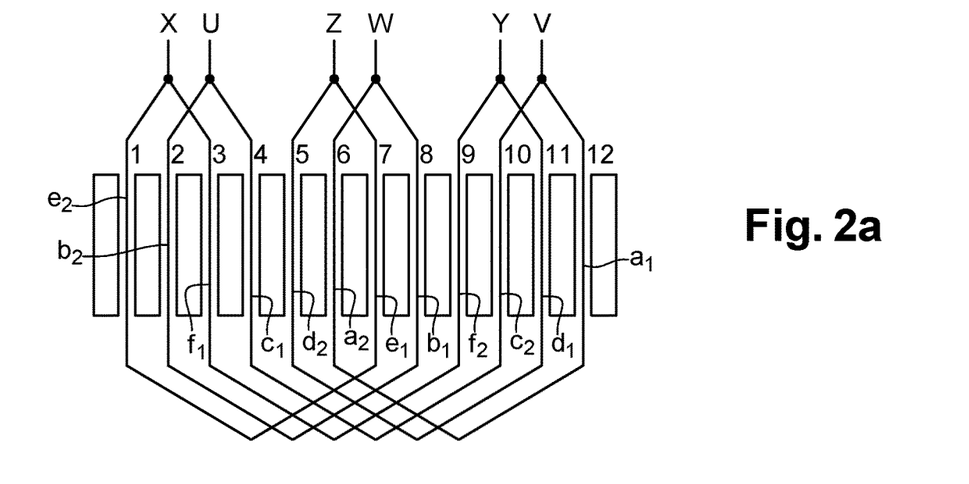
FIG. 2a shows the arrangement of stator windings for a six phase dual machine.

FIG. 2a shows the arrangement of stator windings for a six phase dual machine.

In the example there are two independent winding "arrangements" each comprising six windings. Current is supplied via six supply lines denoted X, U, Z, W, Y, V which are equivalent to lines 2 of FIG. 1.

Figure 2B:
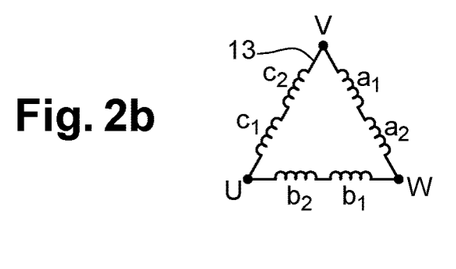
Figure 2C:
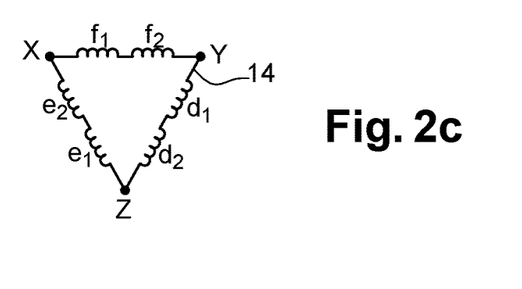

FIGS. 2b and 2c shows a schematic view of each of the independent winding arrangements 13 and 14 of a dual system corresponding to FIG. 2a. This figure shows there are the six connection points U, V, W, X, Y, Z corresponding to the lines. The windings are designated with reference numerals a1, a2, b1, b2, c1, c2, d1, d2, e1, e2, f1, f2.

Winding arrangement 13 includes windings a1 and a2 between points V and W; b1 and b2 between points U and W, and winding c1 and c2 between points U and V. Winding arrangement 14 includes windings d1 and d2 between points Z and Y; e1 and e2 between points Z and X; and winding f1 and f2 between points X and Y.

Thus a1 and a2 in series (coil pair) may be considered a combined winding/coil pair referred to as "a". Similarly b1 and b2 may be considered a combined winding referred to as "b". Likewise for coil pairs (c1 and c2), (d1 and d2), (e1 and e2), (f1 and f2) may be regarded as single combined winding coil pair c,d, e and f respectively.

Figure 3A:
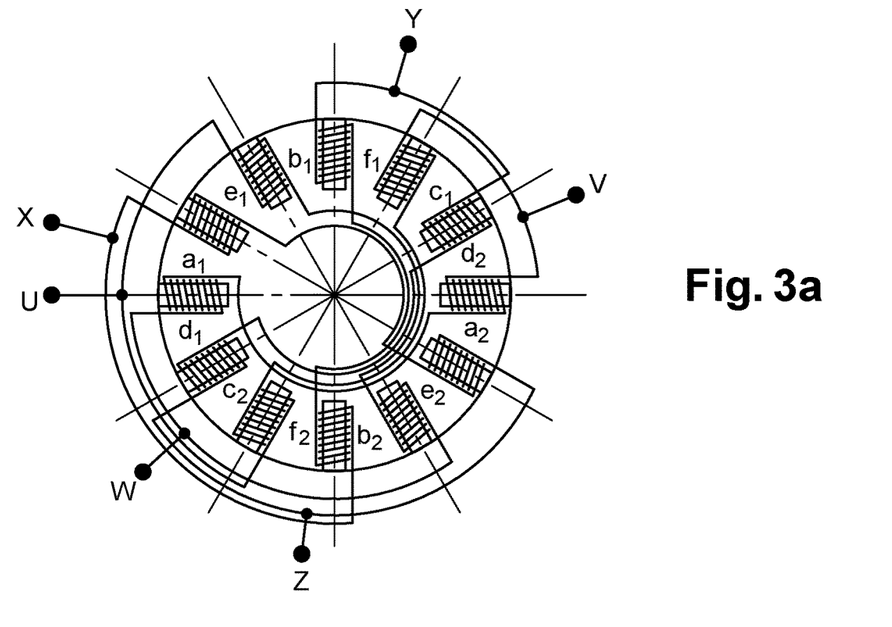
FIG. 3a shows a schematic figure of how the respective windings of are arranged physically in the stator.
Figure 3B:
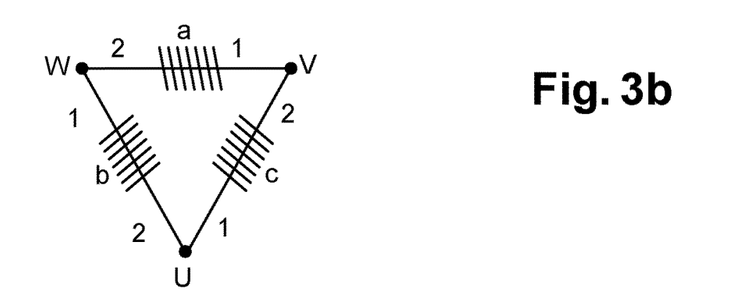
Figure 3C:
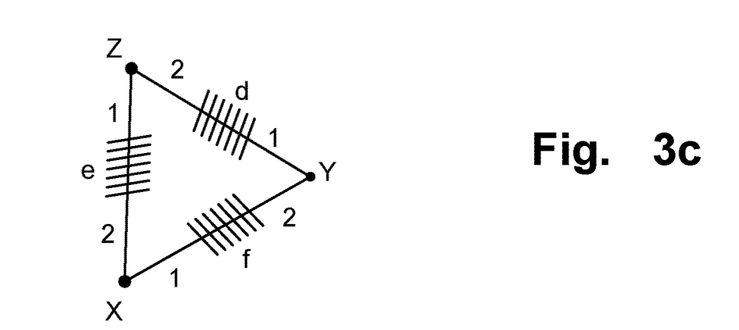

FIG. 3a shows a schematic figure of how the respective windings of are arranged physically in the stator. FIGS. 3b and 3c shows the two winding arrangements 13 and 14 where the windings a1 and a2 are represented together by a, windings b1 and b2 represented together by b, etc.

Figure 3D:
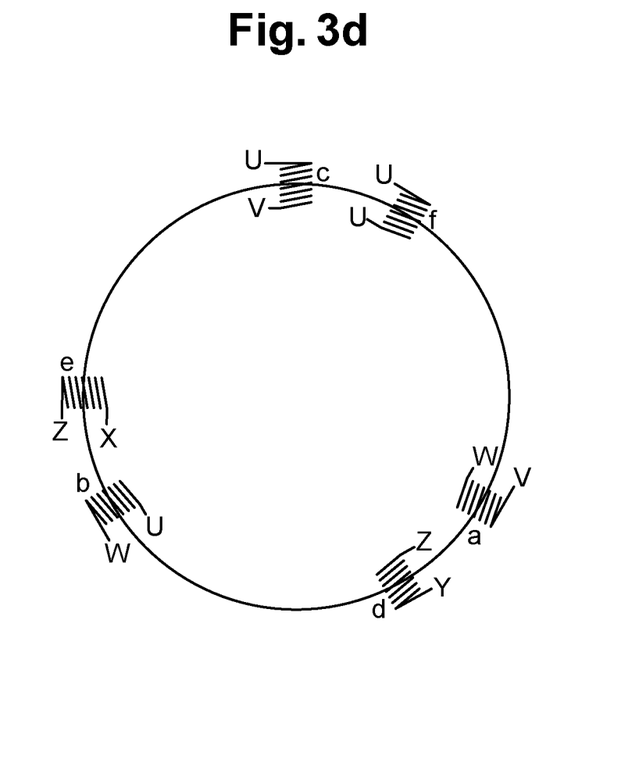
FIG. 3d shows also accurately the angular alignment of the windings.

FIG. 3d shows also accurately the angular alignment of the windings. As can be seen combined winding f (between points X,Y) in respect of a second independent stator is angularly offset by a small amount (e.g. 15 degrees) from combined winding c (between points U,V) of the first independent stator. Likewise combined winding d (between points Z,Y) in respect of a second independent stator is angularly offset by a small amount (e.g. 15 degrees) from combined winding a (between points W,V) of the first independent stator. Combined winding e (between points X, Z) in respect of a second independent stator is angularly offset by a small amount (e.g. 15 degrees) from corresponding combined winding b (between points W, U) of the first independent stator.

The two independent stator (halves) can be designated delta or stator #1 (with windings U, V, W) and delta/stator #2 (with windings X,Y,Z)

Conventionally both deltas (stators) are used to determine the torque and torque is determined as follows:

$$T = \frac{1}{\omega} \cdot \sqrt{\frac{3}{2}} \cdot (V_{d1} \cdot I_{d1} + V_{q1} \cdot I_{q1} + V_{d2} \cdot I_{d2} + V_{q1} \cdot I_{q1});$$

where $\omega$=angular speed, and $$\begin{bmatrix} I_{d1} \\ I_{q1} \end{bmatrix} = \frac{2}{3} \cdot \begin{bmatrix} \cos\theta & \cos\left(\theta - \frac{2\pi}{3}\right) & \cos\left(\theta - \frac{4\pi}{3}\right) \\ -\sin\theta & -\sin\left(\theta - \frac{2\pi}{3}\right) & -\sin\left(\theta - \frac{4\pi}{3}\right) \end{bmatrix} \cdot \begin{bmatrix} I_U \\ I_V \\ I_W \end{bmatrix}$$

$$\begin{bmatrix} I_{d2} \\ I_{q2} \end{bmatrix} = \frac{2}{3} \cdot \begin{bmatrix} \cos(\theta+\gamma) & \cos\left(\theta+\gamma - \frac{2\pi}{3}\right) & \cos\left(\theta+\gamma - \frac{4\pi}{3}\right) \\ -\sin(\theta+\gamma) & -\sin\left(\theta+\gamma - \frac{2\pi}{3}\right) & -\sin\left(\theta+\gamma - \frac{4\pi}{3}\right) \end{bmatrix} \cdot \begin{bmatrix} I_X \\ I_Y \\ I_Z \end{bmatrix}$$

where $\gamma$=angle offset and $\theta$=angular position, where Vd1 and Vd2 is the direct voltage applied across the stators #1 and #2 respectively and Vq1 and Vq2 are the quadrature voltages applied across the stators #1 and #2 respectively.

Vd1, Vd2, Vq1 and Vq2 are known because they are the output from the controller/by the modulator. The modulator is voltage controlled, so those are actually given and the basis for the control strategy. Usually field oriented control PID regulators get Id and Iq as input and Vd and Vq as output. So Vd1 and Vq1 are the output of our current regulator and Vd2 and Vq2 can be n calculated with the angle offset $\gamma$ between the 2 stator (halves) before applied.

Invention

In case of a six phase machine, the two stator (star or delta) windings are electrically independent, but share same magnetic core and rotor. In systems where the machine dynamics are not the primary concern, the approximation that the first stator winding shows the same behavior as the second one with an angular shift of 30° (e1) can be made and used in aspects of the invention. The inventors have made use of this. Each stator arrangement (stator half) contributes about 50% to the torque.

In an example of the invention current measurements are determined in respect of windings of only one, a first of the independent stators. So for example currents may be measured through windings a, b, and c, or alternatively currents though winding d, e, and f. So with reference to coils of FIG. 3d e.g. f from c, d from a and e from b. So either the first (UVW) or the second (XYZ) stator winding can be used for torque measurement (or torque) control.

Normally both deltas to determine the torque and torque is determined as follows:

$$T = \frac{1}{\omega} \cdot \sqrt{\frac{3}{2}} \cdot (V_{d1} \cdot I_{d1} + V_{q1} \cdot I_{q1} + V_{d2} \cdot I_{d2} + V_{q1} \cdot I_{q1}) = T_{UVW} + T_{XYZ}$$

$T_{UVW}$ and $T_{XYZ}$ are the torques provided by each stator (half) i.e. stator arrangement with windings U, V, W and stator arrangement with windings XYZ.

$T_{UVW} \approx T_{XYZ}$ so only need Iu, Iv, Iw are needed for estimation of the torque. In one aspect the torque is determined by the following equation:

$$T \cong \frac{1}{\omega} \cdot \sqrt{6} \cdot (V_{d1} \cdot I_{d1} + V_{q1} \cdot I_{q1}) \cong \frac{1}{\omega} \cdot \sqrt{6} \cdot (V_{d2} \cdot I_{d2} + V_{q2} \cdot I_{q2})$$

again where $\omega$=angular speed, and $$\begin{bmatrix} I_{d1} \\ I_{q1} \end{bmatrix} = \frac{2}{3} \cdot \begin{bmatrix} \cos\theta & \cos\left(\theta - \frac{2\pi}{3}\right) & \cos\left(\theta - \frac{4\pi}{3}\right) \\ -\sin\theta & -\sin\left(\theta - \frac{2\pi}{3}\right) & -\sin\left(\theta - \frac{4\pi}{3}\right) \end{bmatrix} \cdot \begin{bmatrix} I_U \\ I_V \\ I_W \end{bmatrix}$$

$$\begin{bmatrix} I_{d2} \\ I_{q2} \end{bmatrix} = \frac{2}{3} \cdot \begin{bmatrix} \cos(\theta+\gamma) & \cos\left(\theta+\gamma-\frac{2\pi}{3}\right) & \cos\left(\theta+\gamma-\frac{4\pi}{3}\right) \\ -\sin(\theta+\gamma) & -\sin\left(\theta+\gamma-\frac{2\pi}{3}\right) & -\sin\left(\theta+\gamma-\frac{4\pi}{3}\right) \end{bmatrix} \cdot \begin{bmatrix} I_X \\ I_Y \\ I_Z \end{bmatrix}$$

Thus the current measurements of only one stator of a two stator winding arrangement needs to be taken and used for torque estimation. Thus current measurements of only one stator of a two stator winding arrangement can be used for control feedback.

The value of θ can be obtained from an angular position sensor which provides the angle of the rotor relative to the first stator which is named θ. The offset between both stators is named γ so that θ+γ is the angular position of the rotor relative to the second stator.

Current measurement from other the second stator (half) can be used in a similar to determine torque. The output of this be used to fully used for functional safety purposes such as torque monitoring.

Other

As mentioned below it is possible rather than to measure the current through three (combined) coils or lines of one independent stator; to measure just two and infer the third. So if the current is measured for coils a and b, then that of c may be determined without actually measuring the current therethrough. Similarly for could d, e and f for the other stator.

As mentioned use is made of the invention so that functional systems architecture is split such that the first stator winding delta or star is used for closed loop torque control (measurement and regulation), and the second just for torque measurement.

In other words for torque measurement, only measurements from one stator winding (group) need to be used. Thus in the case of the six phase dual delta or dual star machine, e.g. of FIG. 1, only three of the lines 4 need to be used to determine torque/power. Either the first (UVW) or the second (XYZ) stator winding can be used for torque control. The other one for verification. It could even be allowed using both for both tasks but in time independent manner (UVW: control, verify, control, verify, . . . and XYZ: verify, control, verify, control, . . . ), as long as one stator winding is used for control and the other for verification, independence can be guaranteed.

Figure 4:
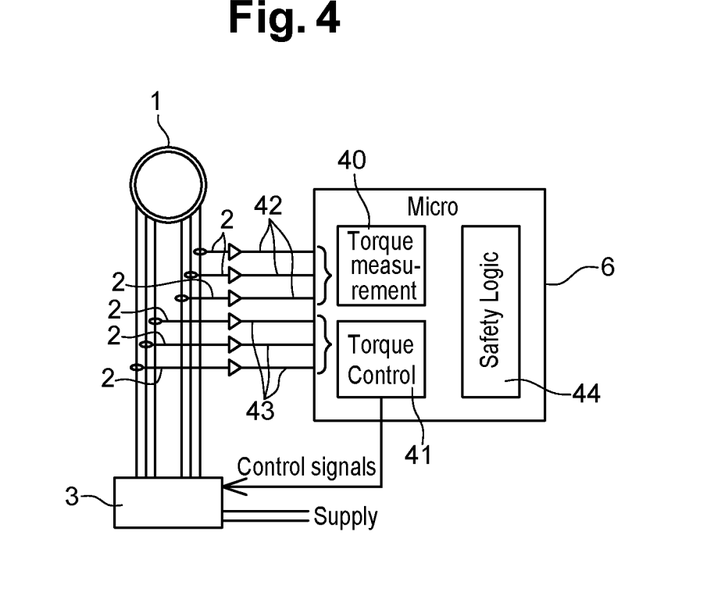
FIG. 4 shows a basic example of a system according to the invention.

FIG. 4 shows a basic example of a system according to the invention and like numerals are the same as in FIG. 2. Here the current through only three 42 of the six lines 2 of the are used in torque measurement functionality i.e. input to torque measurement block 40. The three lines 42 used are from the same stator windings arrangement i.e. with respect only one of the two winding arrangements in a dual winding machine; i.e. 13 or 14 of FIGS. 3*a* and 3*b*.

Torque Measurement/Torque Control.

The skilled person would be aware of the different ways of torque control (with inherent torque measurement) such as field oriented control (FOC), which is well explained in literature. It consists of measuring at least 2 phase currents per stator (actually the 3rd current can most of the times be calculated, because $I_U + I_V + I_W = 0$). Those 3 phase currents ($I_U$, $I_V$, $I_W$) can be transformed in an equivalent 2 phase system ($I_\alpha$, $I_q$) via the Clark transformation. Taking into account the current rotor position, those currents can be mapped on to the rotating rotor (coordinate transformation) using the Park transformation. As a result we get two equivalent rotating currents $I_d$ and $I_q$. Those are DC currents (all others are AC currents). $I_d$ is responsible for generating the stator magnetic field and $I_q$ is responsible for generating the torque. $I_q$ is proportional to the delivered or consumed torque. This is the way the torque measurement is done. Further information can be seen at https://en.wikipedia.org/wiki/Vector_control_(motor).

In a classical controls mechanism (PI/PID or whatever) the desired torque and the measured torque (from $I_q$ above) are used to determine the settings for the output modulator driving the 6 phases (in any case we will drive the 6 phases with the 12 transistor bridge). The controls mechanism output is a voltage and an angle. The modulator takes those to switch the transistors of the bridge accordingly.

In a further additional or alternative aspect three 43 of the six lines may be used in torque control functionality by being input to torque control block 41, again from the same stator windings arrangement i.e. with respect only one of the two winding arrangements in a dual winding machine; i.e. 13 or 14 of FIGS. 3*a* and 3*b*.

For a certain point in time, one stator is defined to be the "torque control stator" the other one the "verification stator". This choice can be permanent or can change during run time. Both cases are allowed as long as both functions are available simultaneously: torque control and torque verification.

The system may include an additional safety logic block 44.

Every stator is independently powered, and only current measurements of one stator (coil arrangement) are used for torque control/regulation. The current measurements of the second stator may be used for torque verification only.

The decomposition of the system can be considered compliant with ISO 26262 or similar safety standards. Common mode failures are minimized due to the redundant hardware path of the measurement system. Considerable cost reduction is possible, since no additional measurement system is required. For non-safety relevant systems, a set of amplifiers could be saved, but due to symmetry requirements to the stator windings, the shunts have to be maintained. The only drawback is the reaction time on transients and dynamics in general, but on belt driven machines dynamics are less critical than on direct driven machines which are anyhow three phase machines.

In a basic summary, only current measurements from 2 or 3 lines of one stator are needed for torque measurement or control. The current in the remaining six lines of both stators can be inferred e.g. from the angular relationship. 3. Thus current measurement from 2 or 3 lines of one stator coil arrangement can be taken and used to determine torque for control and measurements form 2 or 3 lines of the other stator coil arrangements can be used to determined torque for e.g. another (independent) purpose e.g. safety.

The invention claimed is:

1. A method of measuring torque in a six phase electrical motor, said six phase electrical motor including a motor stator including a first stator winding arrangement and a second stator winding arrangement which is electrically independent of the first stator winding arrangement, the first stator winding arrangement and the second stator winding arrangement each comprising three combined windings; the first stator winding arrangement and the second stator winding arrangement being symmetrical and offset by an angle to each other, such that each of the three combined windings of the second stator winding arrangement has a corresponding combined winding in the first stator winding arrangement and offset thereto by an angle, said method comprising:

a) determining a first value of currents in the three combined windings of the first stator winding arrangement and a second value of the currents in the three combined windings of the second stator winding arrangement;

b) determining a first value and a second value of the torque from the first value and the second value, respectively, of the currents determined from a); and c) controlling an operation of the six phase electrical motor using the first value of the torque, and using the second value of the torque for independent purposes including safety or monitoring.

2. The method as claimed in claim 1, wherein the first value of the torque is determined from following equation:

$$T \cong \frac{1}{\omega} \cdot \sqrt{6} \cdot (V_{d1} \cdot I_{d1} + V_{q1} \cdot I_{q1})$$

where $\omega$=angular speed, and $$\begin{bmatrix} I_{d2} \\ I_{q2} \end{bmatrix} = \frac{2}{3} \cdot \begin{bmatrix} \cos\theta & \cos\left(\theta - \frac{2\pi}{3}\right) & \cos\left(\theta - \frac{4\pi}{3}\right) \\ -\sin\theta & -\sin\left(\theta - \frac{2\pi}{3}\right) & -\sin\left(\theta - \frac{4\pi}{3}\right) \end{bmatrix} \cdot \begin{bmatrix} I_X \\ I_Y \\ I_Z \end{bmatrix}$$

where $\theta$ is the angle of a rotor of the six phase electrical motor relative to the first stator winding arrangement; and where Vd1 is direct voltage applied across windings of the first stator winding arrangement and Vq1 is quadrature voltages applied across the windings of the first stator winding arrangement.

3. The method as claimed in claim 1, wherein the second value of the torque is determined from following equation:

$$\frac{1}{\omega} \cdot \sqrt{6} \cdot (V_{d2} \cdot I_{d2} + V_{q2} \cdot I_{q2})$$

where $\omega$=angular speed, and $$\begin{bmatrix} I_{d2} \\ I_{q2} \end{bmatrix} = \frac{2}{3} \cdot \begin{bmatrix} \cos(\theta + \gamma) & \cos\left(\theta + \gamma - \frac{2\pi}{3}\right) & \cos\left(\theta + \gamma - \frac{4\pi}{3}\right) \\ -\sin(\theta + \gamma) & -\sin\left(\theta + \gamma - \frac{2\pi}{3}\right) & -\sin\left(\theta + \gamma - \frac{4\pi}{3}\right) \end{bmatrix} \cdot \begin{bmatrix} I_X \\ I_Y \\ I_Z \end{bmatrix}$$

where Vd2 is direct voltage applied to windings of the second stator winding arrangement and Vq2 is quadrature voltage applied to the windings of the second stator winding arrangement; and where $\theta$ is the angle of a rotor of the six phase electrical motor relative to the first stator winding arrangement.

4. The method as claimed in claim 1, wherein step a) is performed by measuring the first value of the currents in the three combined windings of the first stator winding arrangement and measuring the second value of the currents in the three combined windings of the second stator winding arrangement.

5. The method as claimed in claim 1, wherein step a) comprises i) measuring the currents in two of the three combined windings of the first stator winding arrangement or in two of the three combined windings of the second stator winding arrangement, and ii) determining or inferring the currents in the other of the three combined windings thereof from the currents of step i).

6. The method as claimed in claim 1, wherein the currents are measured in a phase path.

7. The method as claimed in claim 1, wherein the six phase electrical motor includes an inverter and the currents are measured in a ground leg of the inverter.

8. The method as claimed in claim 1, wherein said six phase electrical motor is a six phase dual delta or dual star machine.

9. One or more controllers for a six phase electrical motor, said six phase electrical motor including a motor stator including a first stator winding arrangement and a second stator winding arrangement which is electrically independent of the first stator winding arrangement, the first stator winding arrangement and the second stator winding arrangement each comprising three combined windings; the first stator winding arrangement and the second stator winding arrangement being symmetrical and offset by an angle to each other, such that each of the three combined windings of the second stator winding arrangement has a corresponding combined winding in the first stator winding arrangement and offset thereto by an angle, wherein the one or more controllers are configured to:

a) determine a first value of currents in the three combined windings of the first stator winding arrangement and a second value of the currents in the three combined windings of the second stator winding arrangement;

b) determine a first value and a second value of torque from the first value and the second value, respectively, of the currents determined from a); and c) control an operation of the six phase electrical motor using the first value of the torque, and using the second value of the torque for independent purposes including safety or monitoring.

10. The one or more controllers as claimed in claim 9, wherein the one or more controllers are further configured to determine the first value of the torque from the following equation:

$$T \cong \frac{1}{\omega} \cdot \sqrt{6} \cdot (V_{d1} \cdot I_{d1} + V_{q1} \cdot I_{q1})$$

where $\omega$=angular speed, and $$\begin{bmatrix} I_{d2} \\ I_{q2} \end{bmatrix} = \frac{2}{3} \cdot \begin{bmatrix} \cos\theta & \cos\left(\theta - \frac{2\pi}{3}\right) & \cos\left(\theta - \frac{4\pi}{3}\right) \\ -\sin\theta & -\sin\left(\theta - \frac{2\pi}{3}\right) & -\sin\left(\theta - \frac{4\pi}{3}\right) \end{bmatrix} \cdot \begin{bmatrix} I_X \\ I_Y \\ I_Z \end{bmatrix}$$

where Vd1 is direct voltage applied across windings of the first stator winding arrangement and Vq1 is quadrature voltages applied across the windings of the first stator winding arrangement; and where $\theta$ is the angle of a rotor of the six phase electrical motor relative to the first stator winding arrangement.

11. The one or more controllers as claimed in claim 9, wherein the one or more controllers are further configured to determine the second value of the torque from the following equation:

$$\frac{1}{\omega} \cdot \sqrt{6} \cdot (V_{d2} \cdot I_{d2} + V_{q2} \cdot I_{q2})$$

where ω=angular speed, and $$\begin{bmatrix} I_{d2} \\ I_{q2} \end{bmatrix} = \frac{2}{3} \cdot \begin{bmatrix} \cos(\theta+\gamma) & \cos\left(\theta+\gamma-\frac{2\pi}{3}\right) & \cos\left(\theta+\gamma-\frac{4\pi}{3}\right) \\ -\sin(\theta+\gamma) & -\sin\left(\theta+\gamma-\frac{2\pi}{3}\right) & -\sin\left(\theta+\gamma-\frac{4\pi}{3}\right) \end{bmatrix} \cdot \begin{bmatrix} I_X \\ I_Y \\ I_Z \end{bmatrix}$$

where Vd2 is direct voltage applied to windings of the second stator winding arrangement and Vq2 is quadrature voltage applied to the windings of the second stator winding arrangement; and where θ is the angle of a rotor of the six phase electrical motor relative to the first stator winding arrangement.

12. The one or more controllers as claimed in claim 9, further configured to measure the currents in each of the three combined windings of the first stator winding arrangement and in each of the three combined windings of the second stator winding arrangement.

13. The one or more controllers as claimed in claim 9, further configured to:
a) measure current in two of the three combined windings of the first stator winding arrangement or in two of the three combined windings of the second stator winding arrangement, and b) determine or infer the current in the other of the three combined windings thereof.

14. The one or more controllers as claimed in claim 9, further configured to switch the first stator winding arrangement to a torque monitoring stator and to switch the second stator winding arrangement to a torque control stator during run time of the first stator winding arrangement and the second stator winding arrangement.

15. The one or more controllers as claimed in claim 14, further configured to use the second value of the torque for torque verification only.

16. The one or more controllers as claimed in claim 9, wherein the one or more controllers are configured to measure the currents in a phase path.

17. The one or more controllers as claimed in claim 16, wherein the six phase electrical motor includes an inverter and the one or more controllers are configured to measure the currents in a ground leg of the inverter.

18. The one or more controllers as claimed in claim 9, wherein the six phase electrical motor is a six phase dual delta or dual star machine.

19. A method comprising:
determining a first current in a first stator winding of a motor, and determining a second current in a second stator winding of the motor, wherein the a second stator winding is electrically independent of the first stator winding;
determining a first torque from the first current, and determining a second torque from the second current;
controlling an operation of the motor using the first torque; and
monitoring an operation of the motor using the second torque.

20. The method of claim 19, further comprising:
changing the controlling and monitoring operations during run-time of the motor so that the method comprises:
controlling an operation of the motor using the second torque; and
monitoring an operation of the motor using the first torque.

\* \* \* \* \*

UNITED STATES PATENT AND TRADEMARK OFFICE
CERTIFICATE OF CORRECTION

| | | |
|---|---|---|
| PATENT NO. | : 11,953,393 B2 | |
| APPLICATION NO. | : 17/598371 | |
| DATED | : April 9, 2024 | |
| INVENTOR(S) | : Felix Mandoux | |

It is certified that error appears in the above-identified patent and that said Letters Patent is hereby corrected as shown below:

In the Claims

Column 10, Line 58, in Claim 10, delete --Vdl-- and insert --Vd1--.

Column 12, Line 19, in Claim 19, delete --the a-- and insert --the--.

Signed and Sealed this
Second Day of July, 2024

Katherine Kelly Vidal
*Director of the United States Patent and Trademark Office*